United States Patent [19]

Sondergeld

[11] Patent Number: 5,056,047
[45] Date of Patent: Oct. 8, 1991

[54] METHOD AND DEVICE FOR MEASURING FLUIDIC OR CALORIMETRIC PARAMETERS

[75] Inventor: Manfred Sondergeld, St. Georgen/Schwarzwald, Fed. Rep. of Germany

[73] Assignee: Gebr. Schmidt Fabrik fur Feinmechanik, Fed. Rep. of Germany

[21] Appl. No.: 447,376

[22] Filed: Dec. 7, 1989

[30] Foreign Application Priority Data

Dec. 10, 1988 [DE] Fed. Rep. of Germany ....... 3841637

[51] Int. Cl.$^5$ ............................................. G01F 25/00
[52] U.S. Cl. ..................................... 364/556; 364/510
[58] Field of Search ............... 364/557, 556, 509, 510, 364/431.05; 374/43, 44; 73/204.14, 204.16, 204.17, 204.18, 204.23, 204.25; 123/478, 488, 494

[56] References Cited

U.S. PATENT DOCUMENTS

| | | | |
|---|---|---|---|
| 4,028,689 | 6/1977 | Schopp | 364/510 |
| 4,250,747 | 2/1981 | Diprose et al. | 364/510 |
| 4,264,961 | 4/1981 | Nishimura et al. | 364/510 |
| 4,355,908 | 10/1982 | Weisser et al. | 73/204 |
| 4,404,846 | 9/1983 | Yamauchi et al. | 364/510 |
| 4,501,145 | 2/1985 | Boegli et al. | 374/44 |
| 4,522,512 | 6/1985 | Atkins | 364/557 |
| 4,807,151 | 2/1989 | Citron | 364/510 |
| 4,872,339 | 10/1989 | Gerhard et al. | 364/510 |

FOREIGN PATENT DOCUMENTS

| | | |
|---|---|---|
| 0210509 | 7/1986 | European Pat. Off. . |
| 3543281 | 7/1985 | Fed. Rep. of Germany . |
| 3639666 | 11/1986 | Fed. Rep. of Germany . |
| 3706622 | 3/1987 | Fed. Rep. of Germany . |
| 3710224 | 3/1987 | Fed. Rep. of Germany . |
| 2487973 | 8/1980 | France . |

Primary Examiner—Salvatore Cangialosi
Attorney, Agent, or Firm—Harness, Dickey & Pierce

[57] ABSTRACT

A method and a device serve for measuring fluidic or calorimetric parameters, for example the velocity of flow, and comprise the steps of heating up a sensor element arranged in a measuring environment, to a temperature higher than the surrounding temperature of the measuring environment, and deriving the parameter from the heat transmission between the measuring environment and the sensor element. In order to permit measurements the result of which is systematically independent of the absolute value of the heating power in the sensor element, two measurements are carried out successively at different temperatures, in the stationary condition. One determines the heating power at both these operating conditions and derives therefrom the parameter to be measured (FIG. 7).

11 Claims, 4 Drawing Sheets

METHOD AND DEVICE FOR MEASURING FLUIDIC OR CALORIMETRIC PARAMETERS

The present invention relates to a method and a device for measuring fluidic or calorimetric parameters comprising the steps of heating up a heatable, temperature-sensitive sensor element, which is in thermal contact with a measuring environment, successively to at least two different temperatures higher than the surrounding temperature of the measuring environment, and deriving the parameter from the heat transmission between the measuring environment and the sensor element, by means of the heat transmission function for the sensor element, defined as the ratio between the thermal flow at the higher temperature and the difference between the higher temperature and the surrounding temperature, as a function of the parameter.

The method and the device according to the invention serve preferably for measuring the speed of a flowing medium, the volume flow or the mass flow of a fluid, the filling level of fluids, or for measuring the thermal conductivity, the heat capacity or the heat transport.

A method and a device for determining air mass flows have been known from German Disclosure Document No. 37 10 224. In these known arrangements, a heatable, temperature-sensitive sensor element, which is in thermal contact with the measuring environment, is heated up and cooled down in periodic succession. To this end, one applies initially a heating current to a heatable element, whereby the temperature of the element, and the voltage drop across the element, are caused to rise according to an exponential function. Once a predetermined upper voltage threshold has been reached, the current is switched over from a relatively high value of the heating current to a considerably lower value of a measuring current, with the result that the temperature drops again according to an exponential function, and the voltage, too, decreases in the same manner, except for a voltage surge occurring when the current is switched over. One then measures the time interval between the moment when the current is switched over and the moment at which a second predetermined lower voltage value is reached, i.e. the length of the cooling-down phase to a predetermined lower temperature. The length of this cooling-down phase provides a measure for the air mass flow to be measured, the cooling efficiency being the higher the greater the air mass flow is.

U.S. Pat. No. 4,501,145 describes a method and a device for measuring a fluidic parameter by means of a sensor immersed in a fluid. According to a first variant of this known method the sensor is heated up, by means of a short-term heating-current pulse from a static balanced condition, in which it finds itself at the temperature of the surrounding fluid. After switching-off the heating-current pulse, the sensor is then only supplied with a much lower measuring current which, while permitting resistance measurements to be carried out, does not notably heat up the measuring resistor of the sensor. Simultaneously with switching over the heating current to the much lower measuring current, a first pulse is generated for starting a time-measuring arrangement. When the temperature of the sensor, which has risen as a result of the heating-current pulse, drops again a discriminator circuit, which is capable of detecting the moment when two threshold values of the temperature or the associated resistance, respectively, are reached, will trigger again measuring pulses for the time-measuring arrangement at the moment the predetermined threshold values are reached. At the end of each measurement, a total of three measuring pulses have been generated, and the two time intervals between the three measuring pulses have been recorded. It is then possible, with the aid of known formulas, to derive from these time intervals the heat transmission and, from the latter, the desired fluidic parameters. According to another variant of this known method, a Peltier element is used instead of a sensor with a heating resistor, the Peltier element being initially also set to the surrounding temperature of the fluid. The Peltier element is then supplied with current from a current source until the "hot" measuring point on the one hand and the "cold" measuring point on the other hand have assumed a predetermined temperature difference or voltage difference, respectively. One then switches off the Peltier current and observes, in the manner described before, the equalization of temperatures or voltages of the two measuring points of the Peltier element for the purpose of deriving time intervals, as a function of predetermined threshold values, corresponding to the voltage difference.

A very similar method has been known from German Disclosure Document No. 3639666. According to this known method, a heatable measuring sensor is also initially supplied with a heating-current pulse of high intensity and then supplied with a measuring current of low intensity, in order to determine, at the end of the heating interval, the exponential drop of the internal resistance of the measuring sensor, by measurements of the time intervals between the moments when predetermined threshold values are reached.

According to another known method described by European Disclosure Document No. 210509, a heating-current pulse of a predetermined amplitude and length is applied to a suitable measuring element. At the same time, one determines alternatively, during the heating-up period or following the latter, the heating-up curve of the measuring element, which rises exponentially, and its cooling-down curve, which drops exponentially. The desired value to be measured can then be derived from the steepness of the respective curve, the speed of the temperature rise or the temperature drop providing a measure for this value.

Another known method described by French Disclosure Document No. 2487973 uses an arrangement where a first sensor, a heating element and a second sensor are arranged in the direction of flow in a pipe passed by a flowing fluid. This arrangement enables the flow rate of the fluid to be measured by determining either the temperature difference of the two sensors, at constant heating power, or alternatively the heating power to be applied for keeping the temperature difference of the two sensors constant. This is effected, according to the known method, by applying the heating power also in the form of heating-current pulses and recording the exponential curve of the measuring voltages obtained.

These known methods are generally described as "dynamic" methods, because the exponential functions of the temperature rise or drop are obtained only by sections and because no stationary final value of the temperature or voltage (at constant current) is ever reached.

German Disclosure Document No. 3706622 describes another method and a device for determining the air mass flow where a temperature-sensitive sensor element is supplied with a constant electric heating power. The current and the voltage are measured at the heatable element, and the heating power is derived, and then adjusted to a constant value, by multiplying the measured values. Further, a momentary resistance value of the heatable element is determined by dividing the voltage and the current values, and the resistance value so obtained is translated into a temperature value by means of a corresponding curve. Another curve then serves for deriving an air mass value from the temperature value, taking into account the surrounding temperature. This other known method is generally described as a "static" method because the sensor element remains constantly in a stationary state of equilibrium.

However, these known methods and devices are connected with a number of disadvantages.

As mentioned before, in the case of the dynamic method, there always exists a thermal imbalance between the sensor element and the measuring environment because the interval between the voltage dropping across the element (or alternatively the time interval) are intentionally fixed in such a manner that no stationary conditions are obtained between the heating-up or the cooling-down process, in order to obtain the shortest possible measuring cycle time, compared with the thermal time constant of the sensor element. This operating mode necessarily leads to the result that the temperature distribution in the sensor element, the development in time of the cooling-down curve and, accordingly, the measuring result are made dependent explicitly on the heating infeed, in particular the heating current or the heating voltage so that precise constant-feed sources are required.

Dynamic methods and devices of the known type are further connected with the drawback that the measuring result depends on the output temperature of the measuring environment, i.e. on the surrounding temperature. In order to achieve results which are independent of this interfering value, complex and expensive compensation measures would be required in the case of dynamic methods and devices.

On the other hand, the known static methods and devices are connected with the disadvantage that the usual drift problems of static methods have to be overcome. In particular, it is absolutely necessary also with the static methods to correct the measuring result with regard to the surrounding temperature because one cannot tell from the measuring result whether the measured value, for example the air mass flow, or only the surrounding temperature has changed. In order to compensate this interfering influence, one therefore has to measure the surrounding temperature. And this requires the use of an additional sensor element causing additional expenses.

Now, it is the object of the present invention to improve a method and a device of the type described above in such a manner that the measuring results obtained are free from such interfering values, in particular free from any influence of the heating infeed and the surrounding temperature, without the need to provide expensive compensation measures, and that the method and device can be implemented at low cost.

Starting out from the method described above, this object is achieved according to the invention by the steps of:

adjusting a first operating condition at the sensor element in a manner such that a stationary temperature equilibrium is obtained between the sensor element and the measuring environment at a first predetermined higher temperature;

determining a first value of the electric heating power at the first operating condition;

adjusting a second operating condition at the sensor element in a manner such that a stationary temperature equilibrium is obtained between the sensor element and the measuring environment at a second predetermined higher temperature;

determining a second value of the electric heating power at the second operating condition;

determining the difference between the first and the second values of the heating power;

dividing the difference between the values of the heating power by the difference of the first and the second predetermined higher temperature values, and comparing the quotient with the heat transmission function to derive therefrom the parameter as a numerical value.

Starting out from the device described before, the object underlying the present invention is achieved by the following features:

The sensor element is formed preferably with the aid of a temperature-dependent heating resister;

the sensor element is connected to an electric supply source;

measurement pick-ups are connected to the sensor element for picking up the current flowing through the heating resistor and the voltage dropping across the heating resistor;

the measurement pick-ups are connected to a divider;

the divider is connected to the input of a comparator;

another input of the comparator can be connected alternatively to a first constant-value storage or a second constant-value storage, via a change-over switch;

the output of the comparator is connected to the control input of the electric supply source;

the measurement pick-ups are connected to a multiplier;

the multiplier can be connected alternatively to a first intermediate storage or a second intermediate storage, in response to the position of the change-over switch;

the intermediate storages are connected to a subtractor;

the subtractor is connected to a display unit, via a weighing stage.

This solves the object underlying the invention fully and perfectly because by combining the measured values obtained at the two operating conditions, the influence of the surrounding temperature is finally eliminated. Consequently, the measuring result is systematically free from any influences of this interfering value, so that no additional temperature compensation is required. Given the fact that the measuring values are picked up at a state of temperature equilibrium, the measuring result is also independent of the development in time of the heating-up and cooling-down curves.

The measuring result is also independent of the resistance value of the particular heating resistor used and, accordingly, also independent of any aging phenomena of the heating resistor, and any current and voltage variations.

Further, the measuring values obtained are independent of the shape of the temperature curve of the sensor element and also of its dynamic characteristics.

Due to the fact that the measured values are picked up at the two operating conditions in succession, a multiplex measuring system is realized which can do with a single sensor element. One arrives in this manner at a compact and also a low-cost solution which is free from influences resulting from unit variations and from positional correlations between the measuring element and the reference element, as occurring in arrangements using a plurality of sensor elements.

A preferred embodiment of the method according to the invention is characterized by the fact that the first and the second operating conditions are adjusted by means of an automatic control circuit which compares the quotient of the actual voltage and current values occurring at a temperature-dependent resistor of the sensor element with a predetermined resistance value of the temperature-dependent resistor corresponding to the predetermined higher temperature, and makes use of the difference for adjusting the operating condition.

According to other, alternative embodiments of the invention, the temperature-dependent resistor may take the form of a separate measuring resistor which may, preferably, be arranged on the same chip as the heating resistor of the sensor element. According to a preferred embodiment, however, the heating resistor is used itself as temperature-dependent resistor. One obtains in this manner a single-element sensor with incorporated heating where all relevant measuring processes occur at one and the same point within the sensor element.

Although, preferably, for adjusting the operating condition, the current is adjusted via the heating resistor, it is also possible to adjust the voltage at the heating resistor.

This type of regulation results in advantageously short measuring cycle times. The adjusting time constant for the heating-up and cooling-down phases is smaller in this case than the thermal time constant of the sensor element, by the amplification factor of the regulating loop. For, thanks to the use of such a regulation, it is now possible to heat the heating resistor up rapidly by applying initially a very high heating power, in order to "brake" the heating process later in a controlled manner, until the desired stationary final value has been reached. Consequently, it is not necessary in the case of the present invention to wait until the exponential temperature curve has approximated automatically to the final value with sufficient accuracy, with the respective time constant. It is, thus, possible to achieve extremely short measuring times which is of critical importance in particular in the case of measuring processes involving temperature measurements. The regulator used in this connection is also described as "constant-value regulator" according to the "BCTR method" ("Bistable Constant Temperature Regulation").

Another particularly preferred embodiment of the method according to the invention is characterized by the fact that the environmental temperature is derived from the values of the heating power and the predetermined higher temperatures.

This feature provides the advantage that the method according to the invention and/or the devices used for carrying out this method may be used simultaneously for determining the environmental temperature, which is often also of interest, without the need to provide substantial additional measures.

Other advantages of the invention will appear from the specification and the attached drawing.

It is understood that the features that have been described before and will be explained hereafter may be used not only in the described combinations, but also in any other combination, or individually, without leaving the scope and intent of the present invention.

Certain embodiments of the invention will now be described in more detail with reference to the drawings in which.

Figure 1:
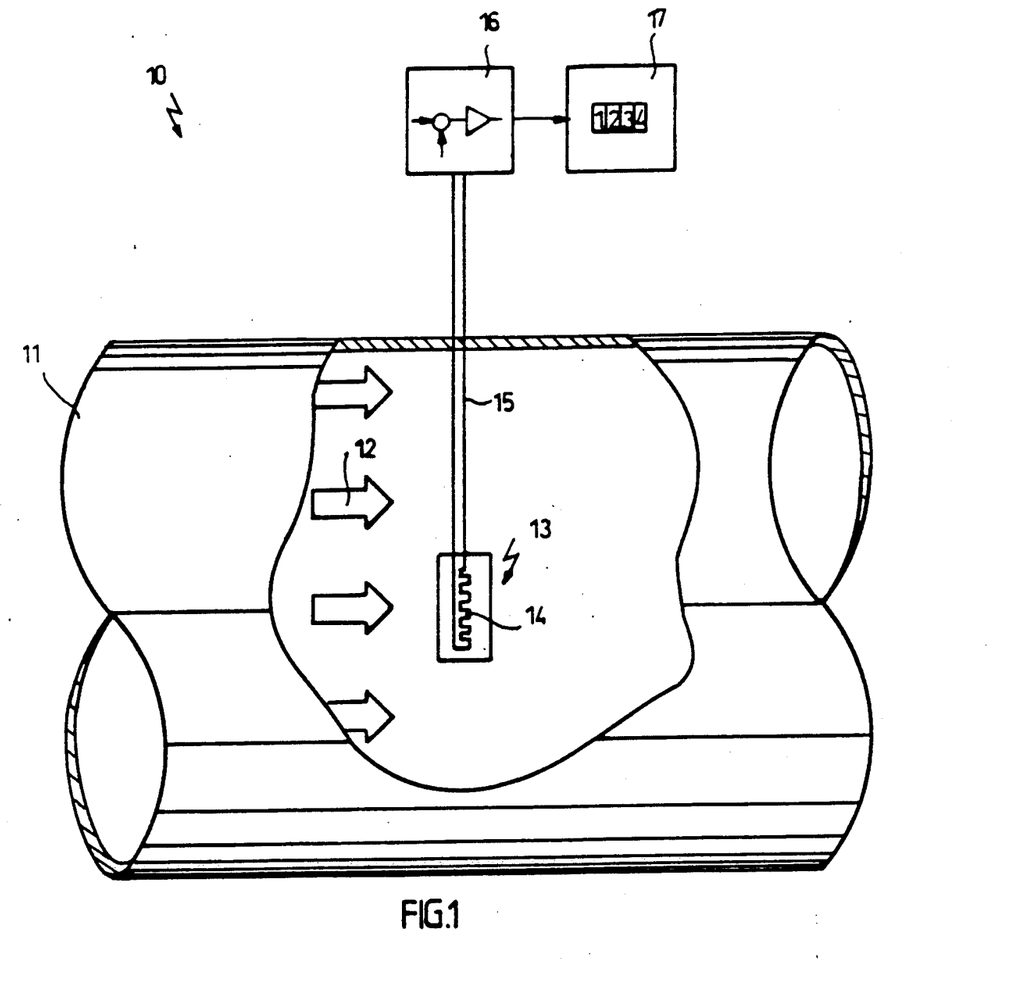
FIG. 1 shows a diagrammatic view of an arrangement for measuring fluidic or calorimetric parameters.

In FIG. 1, a measuring arrangement of the type which is of interest in connection with the present invention is designated generally by reference numeral 10.

A fluid flow 12, for example a gas or a liquid, is passed through a pipe 11. The fluid flow 12 acts upon a heatable, temperature-sensitive sensor element 13 comprising a heating resistor 14. The sensor element 13 is connected to a measuring and regulating circuit 16 via a line 15. The circuit 16 in turn is connected to an indicator unit 17.

With the aid of the measuring arrangement 10 it is possible to determine the speed of the fluid flow 12, its volume flow or mass flow. It is expressly noted, however, that the described measurements are to be understood only as examples and that the present invention may be used also to solve other measuring problems. As the present invention makes use of the heat transmission between the heatable sensor element 13 and its environment, the invention may be used with advantage also for measuring the filling level of liquids and other media which either surround or do not surround the sensor element 13, depending on the filling level, so that the heat transmission varies according to the latter. In addition, the present invention may be used with advantage for measuring the thermal conductivity, the heat capacity or the heat transport when the sensor element 13 consists, for example, of a first material to be examined and the environment consists of a second material to be examined, and the interaction between these materials is to be determined.

In the case of the measuring arrangement 10 according to FIG. 1, the sensor element 13 is heated up to a temperature $\theta$ higher than the surrounding temperature $\theta_o$ of the fluid flow 12. The heat flow $\dot{Q}$ at the higher temperature $\theta$ is then determined by the formula:

$$\dot{Q}(\theta) = G(w)(\theta - \theta_0),$$

wherein G (w) is the heat transmission function defining the dependence on the parameter w to be measured, with respect to the particular configuration of the measuring arrangement 10.

If, for example, the measuring parameter w defines the velocity of the fluid flow 12, then the heat transmission function G (w) is defined by the following rule:

$$G(w) = A\alpha_0(1 + \gamma w^{\frac{1}{2}}),$$

wherein A is the area of thermal contact, $\alpha°$ is the heat transmission constant between the sensor element 13 and the fluid flow 12, in the stationary condition of the fluid flow 12, and $\gamma$ is the so-called kinematic convection factor, i.e. a constant determined by the geometry of the measuring arrangement 10, the density of the fluid flow 12, its viscosity and the thermal conductivity and specific heat capacity during the measurement.

Now, if a special parameter w is to be determined, the respective heat transmission function G (w) of the measuring arrangement used must first be solved with respect to the parameter w, whereafter the numerical value of the parameter w can be derived from the before-described relation between the heat flow $\dot{Q}$, the heat transmission function G (w) and the temperatures $\theta$, $\theta_o$.

Figure 2:
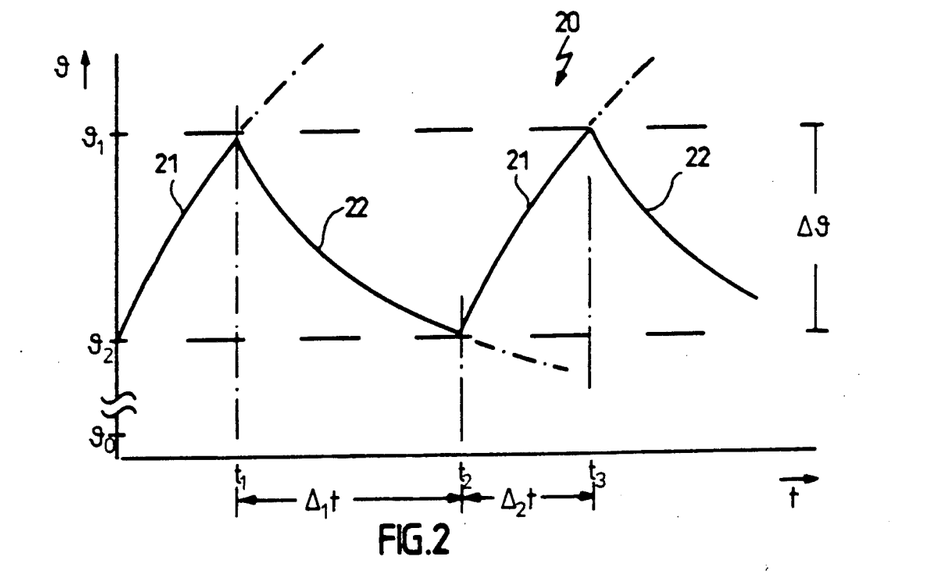
FIG. 2 shows a temperature/time diagram illustrating methods and devices according to the state of the art.

In the case of known measuring arrangements, one proceeds in the manner illustrated in FIG. 2 by the first curve 20 for the temperature $\theta$ of the sensor element 13, plotted as a function of the time t.

According to a first variant of the prior art, one presets a predetermined temperature interval $\Delta\theta$, i.e. a given difference between a higher temperature $\theta_1$ and a lower temperature $\theta_2$, both temperatures being substantially higher than the surrounding temperature $\theta_o$ of the fluid flow 12. One then connects and disconnects alternately an electric energy source to and from the heating resistor 14 so that one obtains the phases 21 for the heating-up process and 22 for the cooling-down process of the sensor element 13, which can be seen clearly in FIG. 2. The temperatures $\theta_1$ and $\theta_2$ may be preset in this case for example in the form of predetermined thermoelectric voltages of a thermocouple element 13 comprised in the sensor element 13.

If the electric energy is disconnected from the heating resistor 14, for example at the point in time $t_1$, the first curve 20 follows the cooling phase 22 to the moment $t_2$ when the lower temperature $\theta_2$ is reached. After the electric energy has been connected again, the curve then follows a heating phase 21 until the higher temperature $\theta_1$ is reached at the moment $t_3$. The respective time intervals elapsed are defined as $\Delta_1 t$ for the cooling phase 22 and $\Delta_2 t$ for the heating phase 21.

Now, the numerical value of the parameter w can be determined in the manner described above, for a particular measuring arrangement 10, from the time intervals $\theta_1 t$ and $\theta_2 t$, for a given temperature interval $\Delta\theta$.

From FIG. 2 it follows directly that it is just as well possible, for another variant according to the prior art, to proceed in the opposite manner, by presetting the time intervals $\Delta_1 t$ and $\Delta_2 t$ and deriving therefrom, as parameters to be measured, the temperatures $\theta_1$ and $\theta_2$ occurring in the sensor element 13 at the end of the heating phase 21 and the cooling phase 22, respectively.

Further, it follows directly from FIG. 2 that the measuring result is directly dependent on the amount of heating power applied and also on the surrounding temperature $\theta_0$.

For the purposes of the present invention one now makes use of the following considerations:

If one presets for the sensor element 13 two temperatures $\theta_1$ and $\theta_2$ as constants, at which a stationary condition is obtained, then the heat flow $\dot{Q}$ ($\theta$) occurring at these two stationary conditions at the temperatures $\theta_1$ and $\theta_2$ will be equal to $$\dot{Q}(\theta_1) = G(w)(\theta_1 - \theta_0)$$

$$\dot{Q}(\theta_2) = G(w)(\theta_2 - \theta_0)$$

according to the formula described further above. As a stationary state of equilibrium is reached at the temperatures $\theta_1$ and $\theta_2$, the heat flow $\dot{Q}$ from the sensor element 13 to the fluid flow 12 is just equal, when this equilibrium is reached, to the steady infeed of heating power P:

$$\dot{Q}(\theta_1) = P_1$$

$$\dot{Q}(\theta_2) = P_2$$

When forming the difference between these heating power values, one obtains the formula $$\Delta P = G(w)(\theta_1 - \theta_2),$$

which shows clearly that the difference $\Delta P$ is independent of the surrounding temperature $\theta_0$ and, when constant values are preset for the temperatures $\theta_1$ and $\theta_2$, is a function only of the parameter w.

If one then determines the heating power $P_1$ and $P_2$, respectively, at the two operating conditions with a stationary state of equilibrium, at the temperatures $\theta_1$ and $\theta_2$, respectively, one obtains the following measuring formula for the difference $\Delta P$:

$$P = (U \cdot I)_1 - (U \cdot I)_2$$

from which the parameter w to be measured can be derived independently of the surrounding temperature $\theta_0$, by application of the relation described before.

Figure 3:
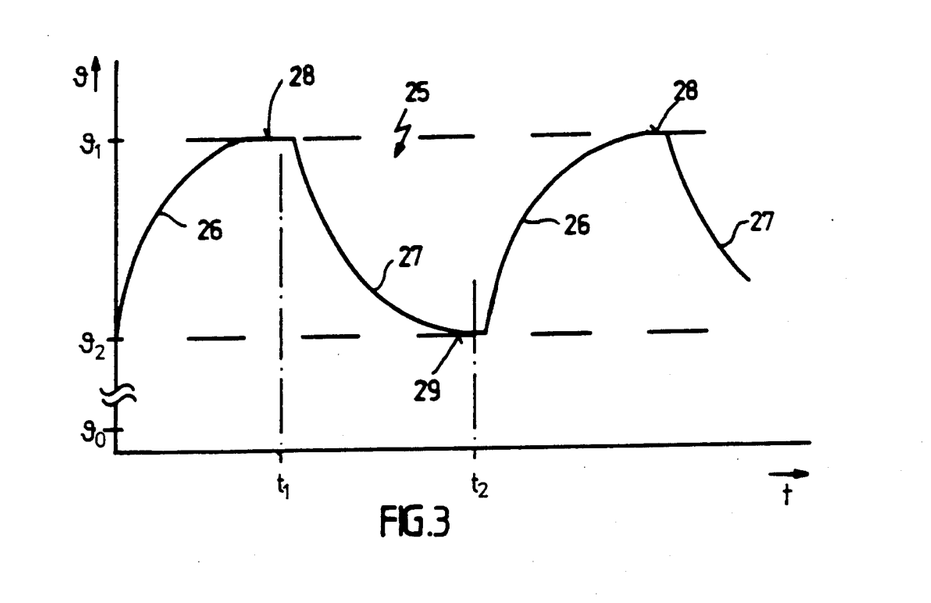
FIG. 3 shows a temperature/time diagram illustrating methods and devices according to the present invention.

FIG. 3 shows a second, comparable curve 25 which is similar to that of FIG. 2 but which—contrary to the prior art as illustrated in FIG. 2, where no stationary conditions are encountered at the reversal points of the curve 20—exhibit upper areas 28 and lower areas 29 reflecting stationary states for both the heating phases 26 and the cooling phases 27, respectively.

In the case of the second curve 25 illustrated in FIG. 3, the heating power $P_1$ and $P_2$ encountered is measured, according to the invention, at the moments $t_1$ and $t_2$, respectively, for the purpose of determining the numerical value of the parameter w in the manner described above.

Figure 4:
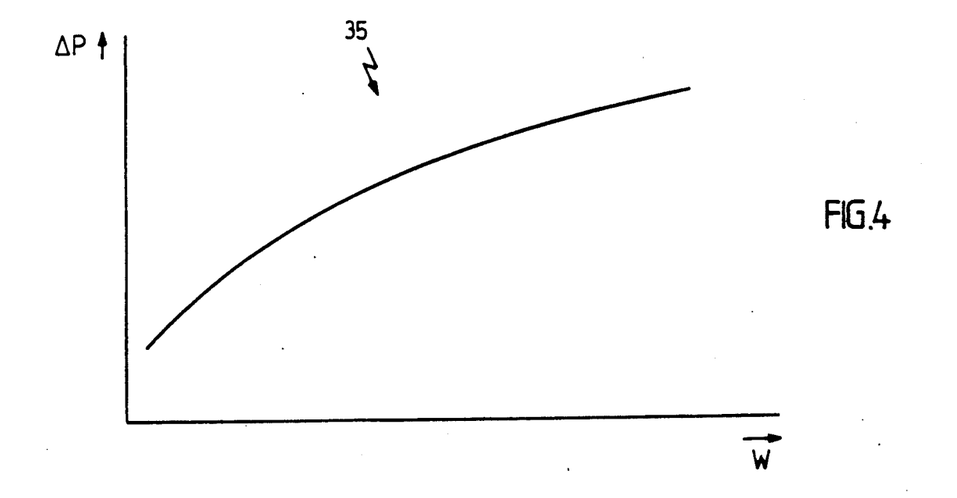
FIG. 4 shows a diagram representing a heat transmission function.

For this purpose, one needs to know the dependence of the difference $\Delta P$ on the parameter w to be measured, which is illustrated for a given example by the curve 35 of FIG. 4. As mentioned before, this third curve 35 is a function of the heat transmission function G (w) and, accordingly, of the respective configuration of the measuring arrangement 10 as regards its geometry, the materials used and their physical characteristics.

From the two equations of state defining $P_1$ and $P_2$ the surrounding temperature $\theta_0$ can be determined in addition to the parameter w. By transforming the equations in a convenient manner, the following formula is obtained for the surrounding temperature $\theta_0$:

$$\theta_0 = \theta_2(P_1/\Delta P) - \theta_1(P_2/\Delta P)$$

The above relation is independent, explicitly, of the parameter w and constitutes, therefore, the conditional equation for the surrounding temperature $\theta_0$, the two higher temperatures $\theta_1$, $\theta_2$ being firmly predetermined.

Figure 5:
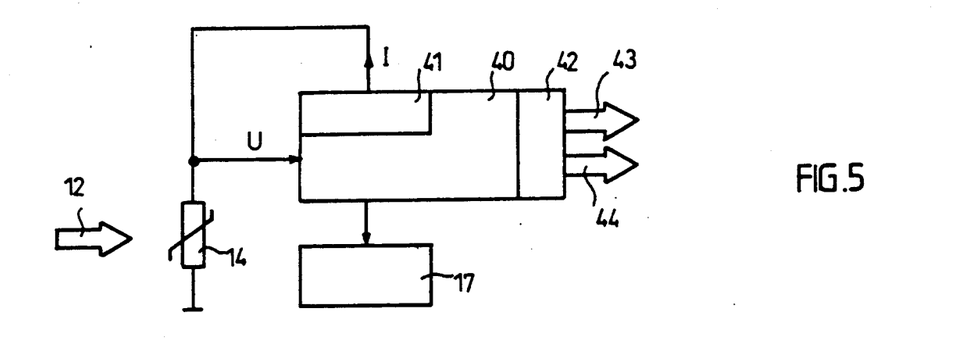
FIGS. 5 and 6 show certain embodiments of a device according to the invention comprising a microcontroller or signal processor, with two alternative solutions regarding the electric supply of the sensor element according to the invention.
Figure 6:
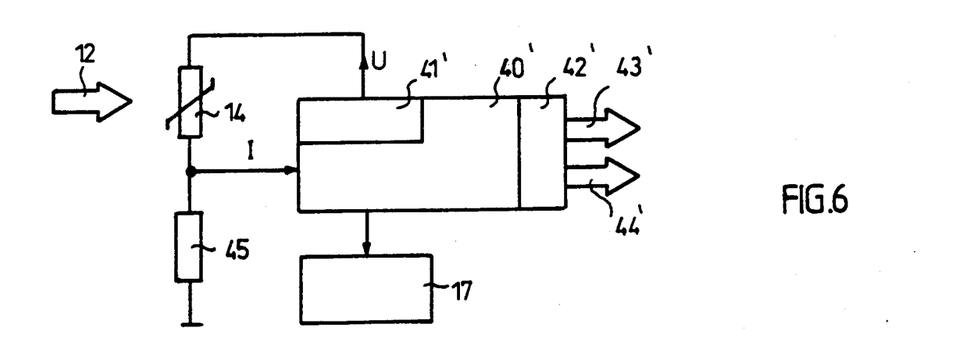

For determining the heating power P in the heating resistor 14, one may make use alternatively of two arrangements of the type illustrated by FIGS. 5 and 6 by way of example.

In the case of the embodiment according to FIG. 5, a signal processor or microcontroller 40 is provided which is equipped with digital regulating means 41 with discrete values in time. The regulating means 41 generates an output current I flowing through the heating resistor 14. The voltage U dropping consequently across the heating resistor 14 is supplied to the processor 40 as an input value. The processor 40 is connected, via a bus interface 42, to a measuring data line 43 and a control line 44 in order to transmit measured parameters for w and $\theta_0$ and to control, for example, peripheral regulating units. The indicator unit 17 may be connected directly to the processor 40.

The operation of the arrangement illustrated in FIG. 5 will be explained in more detail below, with reference to the block diagram of FIG. 7.

Alternatively, FIG. 6 shows a similar arrangement which differs from that illustrated by FIG. 5 essentially insofar as the output value generated by the digital control means 41' is a voltage U which is applied to a voltage divider consisting of the heating resistor 14 and a fixed resistor 45. The measuring signal consists of the current I flowing through the voltage divider 14, 45, which is picked up at the fixed resistor 45 and supplied to the processor 40'. The other elements are identical to those illustrated in FIG. 5 and are, therefore, identified only by an apostrophe.

Figure 7:
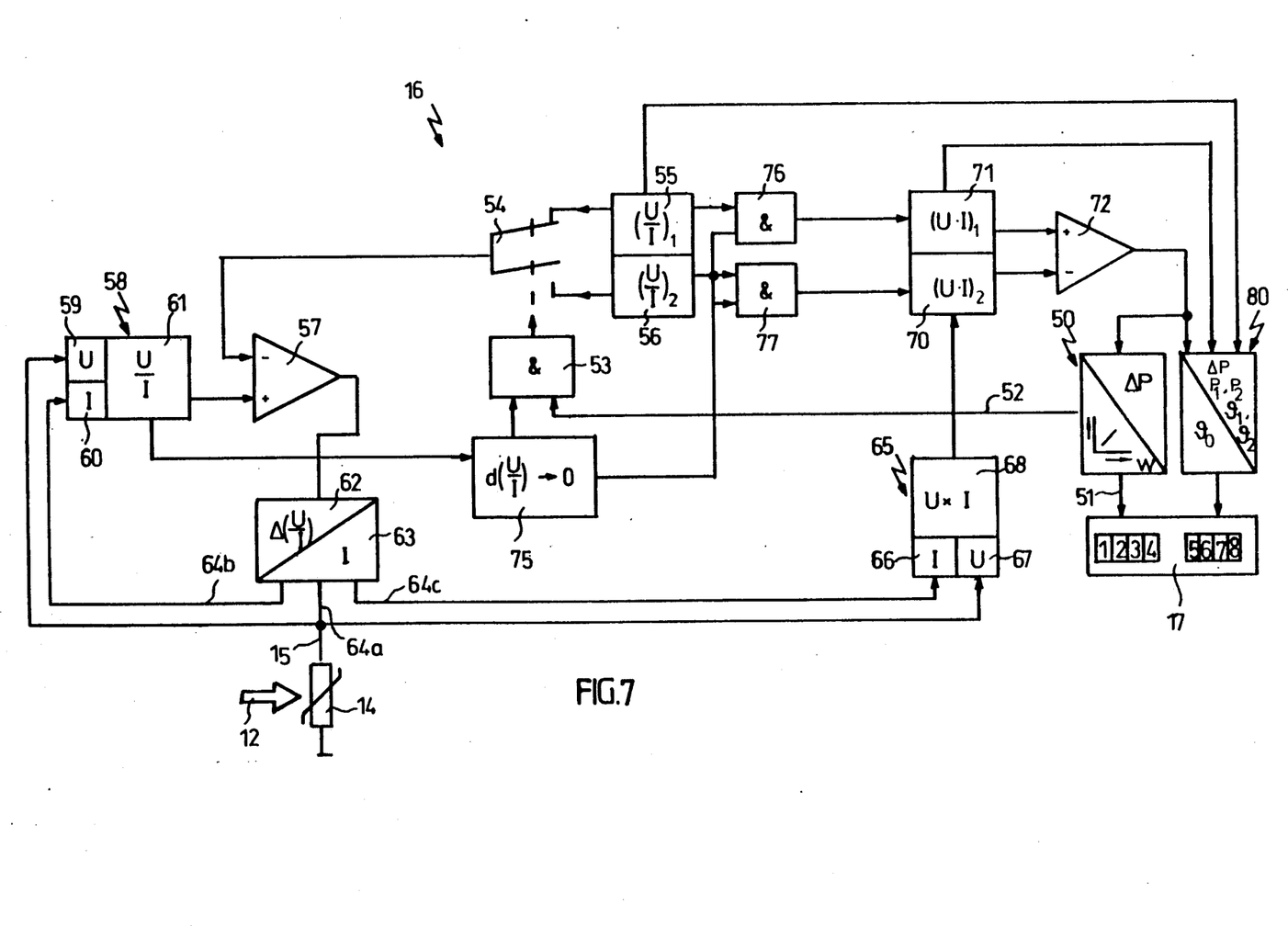
FIG. 7 shows a block diagram of a device according to the invention for carrying out the method according to the invention.

FIG. 7 shows a block diagram of one embodiment of a measuring and regulating circuit 16 according to the invention, which may be used, for example, in the measuring arrangement 10 illustrated in FIG. 1.

A weighing stage 50, in which the third curve 35 according to FIG. 4 is stored as a characteristic curve or field, has its first output 51 connected to the indicator unit 17.

A second output 52 is connected to one input of a first control element 53 which is preferably designed as an AND gate. The first control element 53 controls a change-over switch 54 which enables a first constant-value storage 55 or a second constant-value storage 56 to be connected alternatively to an inverting input of a comparator and/or subtracter 57. The latter's non-inverting input is connected to a first computing stage 58 whose input end consists of two measurement pick-ups 59, 60, while its output end consists of a divider 61.

The output of the comparator 57 controls, via the control stage 62, a variable current source 63 comprising three outputs 64a, 64b and 64c.

The first output 64a is connected to the temperature-responsive heating resistor 14 via the line 15 and, via other lines, to the first measurement pick-up 59 of the first computing stage 58 and to a fourth measurement pick-up 67 of a second computing stage 65. The second output 64b is connected to the second measurement pick-up 60 of the first computing stage 58, and the third output 64c is connected to a third measurement pick-up 66 of the second computing stage 65.

The output of the second computing stage 65 takes the form of a multiplier 68. The latter can be connected selectively to a first intermediate storage 70 or a second intermediate storage 71, depending on the position of the change-over switch 54. The outputs of the storages 70, 71 are connected to a subtracter which in turn is connected to one input of the weighing stage 50.

Another output of the divider 61 of the first computing stage 58 controls a threshold-value detector 75 one output of which is connected to another input of the first control element 53, for actuation of the change-over switch 54. Another output of the threshold-value detector 75 is connected to inputs of a second control element 76 and a third control element 77, whose other inputs are connected to the control outputs of the first constant-value storage 55 and the second constant-value storage 56, respectively. The outputs of the control elements 76, 77 control the intermediate storages 70, 71 in such a manner that the measured values received from the output of the multiplier 78 are stored in the intermediate storage 70, 71 assigned to that constant-value storage 55 or 56 which is connected to the subtracter 57 via the change-over switch 54.

In FIG. 7, one can further see another weighing stage 80 whose input is connected to the constant-value storages 55, 56, the intermediate storages 70, 71 and the subtractor 72. One output of the other weighing stage 80 is likewise connected to the indicator unit 17 which is equipped with a second numerical indication for displaying the output signal of the other weighing stage 80 in numerical values. The elements described above serve for determining and indicating the surrounding temperature $\theta_0$ in the manner described in more detail further above.

The operation of the arrangement illustrated in FIG. 7 is as follows:

The temperatures $\theta_1$ and $\theta_2$ according to FIG. 3 have been entered as constant values into the constant-value storages 55, 56. Given the fact that the relation between the resistance value R of the heating resistor 14 and the temperature $\theta$ is known, the temperature values $\theta_1$ and $\theta_2$ may also be expressed as resistance values or, by application of Ohm's Law, as quotients $(U/I)_1$ or $(U/I)_2$ of the voltage U and the current I. If the higher temperature value $\theta_1$ is to be selected first, the change-over switch 54 must assume the position indicated in FIG. 7. In this position, the constant value $(U/I)_1$ stored in the first constant-value storage 55 is fed to the inverting input of the subtractor 57 whose non-inverting input is supplied with a quotient U/I from the output of the divider 61. This quotient is the quotient of the actual values of the voltage U and the current I encountered at the heating resistor 14 which have been supplied, as measured values, to the measurement pick-ups 59 and 60, i.e. to a voltmeter and an ammeter.

As long as the desired temperature $\theta_1$ has not been reached, the output signal of the divider 61 will remain smaller than the signal received from the first constant-value storage 55, with the result that the resistance/current converter 63 feeds a higher current I into the heating resistor 14 via its first output 64a and the line 15.

The control loop formed by the elements 57, 58, 63 and 14 continues to adjust the current I via the heating resistor 14 until the desired final value $\theta_1$ has been reached. The current I may initially be set to a very high value so that the regulating cycle in the regulating loop will be run through within a minimum of time.

The measured values of the voltage U and the current I are picked up in parallel in the second computing stage 65 by an ammeter and a voltmeter, i.e. the measurement pick-ups 66 and 67, and are multiplied in the multiplier 68 whereby one obtains (UI)₁, i.e. the electric heating power P₁.

However, this value (UI)₁ must not be further processed as long as the stationary state, as reflected by the upper area 28 in FIG. 3, has not been reached.

In order to detect the moment when a stationary state of equilibrium is obtained, or when a condition approximating this state with sufficient exactness prevails, the individual increments of the quotient U/I are picked up from another output of the divider 61 and processed in a threshold-value detector 75.

The approximation of the increment to zero may be detected, for example, by comparing the increment in a comparator with a predetermined lower threshold value.

If a sufficiently exact approximation to the stationary threshold value is reached, an output signal will be generated by the threshold-value detector 75 in both these cases. The output signal causes, on the one hand, via the control elements 76 and 77, the value for the momentary heating power formed in the multiplier 68 to be inscribed into the second intermediate storage 71, and has on the other hand the effect that the change-over switch 54 is switched over and the heating resistor 14 is adjusted to the lower temperature value θ₂.

The regulating cycle of the elements illustrated in FIG. 7 is then repeated analogously until the threshold-value detector 75 signals that the lower threshold value, or a sufficiently exact approximation thereto, has been reached.

After both a heating phase 26 and a cooling phase 27 (FIG. 3) have been run through in this manner, the respective stationary values for the heating power P₁ and P₂ are stored in the intermediate storages 71 and 70. The substractor 72 then forms the difference of these values and feeds the difference to the weighing stage 50 so that, by application of the characteristic curve ΔP (w) of the respective heat transmission function G (w), the numerical value of the parameter w is made available at the first output 51.

The above explanations relating to the regulating unit 57, 61, 63 refer to a regulation system with current infeed, i.e. to the case illustrated in FIG. 5, where the current I is adjusted and the voltage U obtained is picked up as measured value. However, it goes without saying that the block diagram of FIG. 7 may be modified also to replace the current infeed by a voltage infeed for the heating resistor 14, as illustrated in FIG. 6.

It is further understood that the components described above may be implemented also using analog technology, in which case multiplier and divider elements, differential amplifiers, analogue nominal-value selectors, storage elements and a regulator, for example with PI or PID regulating characteristics, will be required.

However, in order to minimize the circuitry input, the measuring and regulating circuit 16 is implemented preferably using digital technology, as indicated before in connection with FIGS. 5 and 6. One then needs a microcontroller or a signal processor provided with an adaptive regulating algorithm.

I claim:

1. A method for measuring a parameter of a fluid flowing through a measuring environment using a heatable, temperature-sensitive sensor element being in thermal contact with the measuring environment, said environment being at an ambient temperature, the method evaluating heat transmission between said measuring environment and said sensor element by means of a heat transmission function for said sensor element, defined as a ratio between thermal flow at a higher temperature above said ambient temperature and a difference between said higher temperature and said ambient temperature, the method comprising the steps of:

setting a first operating equilibrium condition at said sensor element by feeding electric heating power to said sensor element until a stationary temperature equilibrium between said sensor element and said measuring environment at a first predetermined temperature above said ambient temperature is established;

determining a first value of electric heating power at said first operating equilibrium condition;

setting a second operating equilibrium condition at said sensor element by feeding electric heating power to said sensor element until a stationary temperature equilibrium between said sensor element and said measuring environment at a second predetermined temperature above said ambient temperature is established;

determining a second value of electric heating power at said second operating equilibrium condition;

determining a first difference between said first and said second values of heating power;

dividing said difference between said values of heating power by a difference of said first and said second predetermined temperature values, and comparing the resulting quotient with said heat transmission function to derive therefrom said parameter as a numerical value.

2. The method of claim 1, wherein said first and said second operating equilibrium conditions are set by means of an automatic control circuit determining a second difference between a quotient of actual voltage and current values occuring at a temperature-dependent resistor of said sensor element with predetermined resistance values of said temperature-dependent resistor, said resistance values corresponding to said predetermined first and second temperatures, respectively, and setting said operating equilibrium conditions as a function of said second difference.

3. The method of claim 2, wherein said actual values of said current and said voltage are determined at a temperature-responsive heating resistor.

4. The method of claim 3, wherein said current is adjusted at said heating resistor for establishing said operating equilibrium conditions.

5. The method of claim 3, wherein said voltage is adjusted at said heating resistor for establishing said operating equilibrium conditions.

6. The method of claim 1, wherein switching-over from said first to said second operating equilibrium condition occurs when the actual temperature prevailing at said sensor element has approximated said first predetermined temperature by a predetermined amount.

7. The method of claim 6, wherein said approximation to said first predetermined temperature is detected by monitoring an approximation to zero of a variation of said quotient of said actual values of voltage and current.

8. The method of claim 1, wherein said ambient temperature is determined from values of said heating power and said predetermined temperatures.

9. An apparatus for measuring a parameter of a fluid flowing through a measuring environment that is adapted for carrying out steps of heating up a heatable, temperature-sensitive sensor element, being in thermal contact with the measuring environment, to a temperature higher than an ambient temperature of said measuring environment, and deriving said parameter from heat transmission between said measuring environment and said sensor element wherein said sensor element comprises a temperature-dependent heating resistor;

said sensor element is connected to an electric supply source;

measurement pick-ups are connected to said sensor element for picking up current flowing through said heating resistor and voltage dropping across said heating resistor;

said measurement pick-ups are connected to divider means;

said divider means is connected to an input of comparator means;

another input of said comparator means can be connected alternatively to a first constant-value memory and to a second constant-value memory, via change-over switch means;

an output of said comparator means is connected to a control input of an electric supply source;

said measurement pick-ups are connected to multiplier means;

said multiplier means can be connected alternatively to a first intermediate memory and to a second intermediate memory, in response to a switching position of said change-over switch means;

said intermediate memories are connected to subtractor means; and said subtractor means is connected to a display means.

10. The method of claim 1, wherein switching-over from said second to said first operating equilibrium condition occurs when the actual temperature prevailing at said sensor element has approximated said second predetermined temperature by a predetermined amount.

11. The method of claim 10, wherein said approximation to said second predetermined temperature is detected by monitoring an approximation to zero of a variation of said quotient of said actual values of voltage and current.

* * * * *